UNITED STATES PATENT OFFICE.

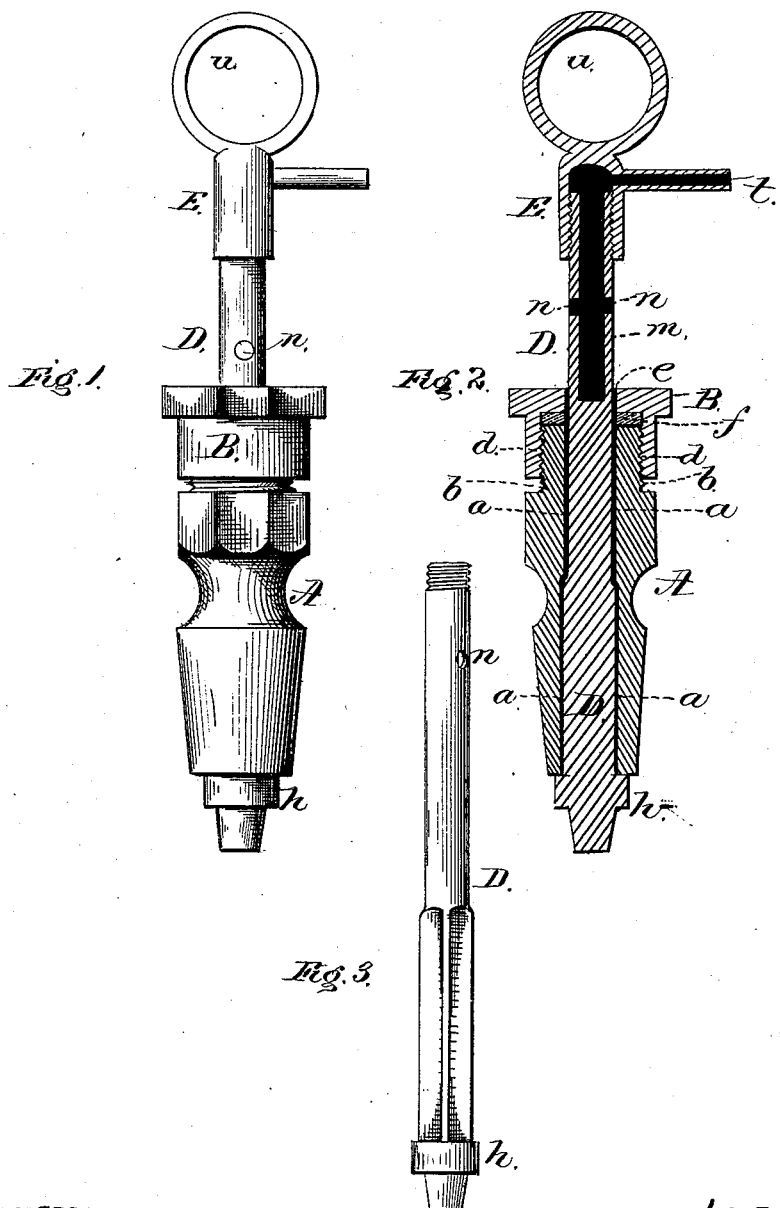

CLAUDIUS VERNIAUD, OF QUINCY, ILLINOIS, ASSIGNOR TO HIMSELF, BERNARD ARNTZEN, LOUIS MILLER, AND JOHN WEBER.

IMPROVEMENT IN COCKS AND FAUCETS.

Specification forming part of Letters Patent No. 199,944, dated February 5, 1878; application filed November 26, 1877.

*To all whom it may concern:*

Be it known that I, CLAUDIUS VERNIAUD, of Quincy, in the county of Adams and State of Illinois, have invented a new and useful Improvement in Cocks and Faucets, of which the following is a specification, reference being had to the accompanying drawings.

The invention relates to an improvement in cocks and faucets; and consists in the devices hereinafter set forth.

The object of the invention is to provide a suitable means for permitting the escape of air, gas, or liquid from barrels, or steam or water from boilers, and for decanting liquor, or other purposes for which cocks or faucets may be used.

Figure 1 is a plan view of a device embodying the elements of the invention. Fig. 2 is a central vertical longitudinal section of same. Fig. 3 is a detached plan view of the stem D.

In the accompanying drawings, A represents the casing, which is furnished with the central aperture $a$, and should be supplied with a thread (not shown) on its rear end, in order to secure it to the barrel or other device to which it is to be attached. The outward end of the casing A is provided with the thread $b$, and is of proper dimensions to receive the packing-nut B, also having a thread, $d$, which meshes with the thread $b$, and thereby retains the said nut in position, at the same time permitting it to be removed and replaced at will. The nut B is furnished with an aperture, $e$, which corresponds with the aperture $a$, and, when the nut is attached to the casing, forms a continuation of the same. Within the nut B are placed the washers or packing $f$, which, when the nut is screwed down on the casing A, insures an air-tight joint.

Within the apertures $a$ $e$ is inserted the valve-stem D, the inward end of which is furnished with an enlargement, $h$, which overlaps the edges of the aperture $a$, and forms a stop, preventing it from passing through. The outward end of the stem D is smooth, and for a portion of its length has its interior removed, forming a conduit, $m$, through which pass the transverse apertures $n$, arranged at a proper distance from the nut B.

Upon the outward end of the stem D is secured, by suitable screw-threads, the cap E, from which projects the auxiliary conduit $t$. Thus it is obvious that air or liquor entering the transverse apertures $n$ would pass through the conduit $m$ into the cap E, and thence flow off through the conduit $t$.

If desired, the cap E may be provided with a ring or handle, $u$, for purposes of convenience in handling the cock or faucet.

It is manifest, when the stem D is pushed inward, that liquor, air, steam, or other matter will enter the apertures $n$, which are now within the casing, and flow through the conduit $m$ and cap E, and escape by means of conduit $t$.

It is also manifest that this flow of liquor or other matter will continue until the stem D is again drawn out, passing the apertures $n$ through the packing, and preventing the further entrance of steam, liquor, or gas.

What I claim as my invention, and desire to secure by Letters Patent, is—

In a cock or faucet, the casing A, provided with the through-aperture $a$, nut B, and packing $f$, in combination with the stem D, extending through the casing, and having the enlargement $h$ on one end, and provided with the apertures $n$, conduit $m$, and conduit $t$, substantially as specified.

In testimony that I claim the foregoing improvement in cocks and faucets, as above described, I have hereunto set my hand this 17th day of November, 1877.

CLAUDIUS VERNIAUD.

Witnesses:
LOUIS MILLER,
JAMES W. HART.